Figure 1:
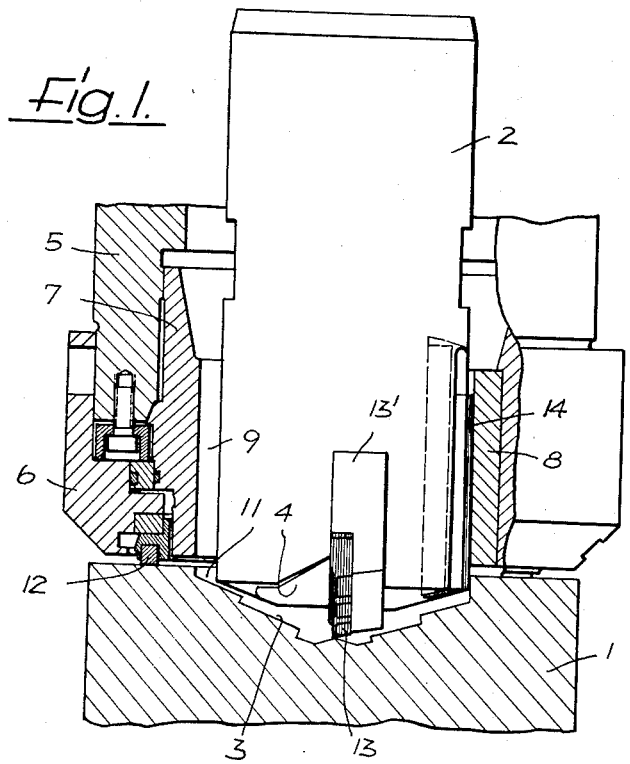

Feb. 11, 1964 W. K. M. KLEINE 3,120,767
GUIDING DEVICE FOR BORER
Filed March 19, 1962

INVENTOR
Werner Kurt Max Kleine

BY

ATTORNEY

United States Patent Office 3,120,767
Patented Feb. 11, 1964

3,120,767
GUIDING DEVICE FOR BORER
Werner Kurt Max Kleine, Bremen-Mahndorf, Germany, assignor to Gebruder Heller, Kreis Verden (Aller), Germany, a firm of Germany
Filed Mar. 19, 1962, Ser. No. 180,793
Claims priority, application Germany Mar. 22, 1961
8 Claims. (Cl. 77—62)

The present invention relates to a device for guiding a borer while starting to cut a bore into a workpiece. Such a guiding device is especially required if the borer has only one lateral cutting edge.

For this purpose it is conventional to employ a so-called boring bushing or boring socket which is secured to a device which is moved together with the borer toward the workpiece, and which then guides the borer when it starts to cut the bore. Since such boring bushings can be economically produced only with a certain manufacturing tolerance and since the borer must in any event be allowed sufficient play in the boring bushing to permit it to slide freely therein, the inner diameter of the bushing must necessarily be slightly larger than the diameter of the bore to be cut. When the cutting edge of the borer then enters the workpiece, the cutting pressure of the borer which is produced when the bore is being started forces the borer at a point spaced from the cutting edge against the inner wall of the boring bushing so that the cutting edge then revolves along a circular path which has a diameter smaller than that which the borer describes when freely rotating. As soon as the borer after starting to cut enters the bore with its entire cross-sectional size, it will become wedged therein since the mouth of the bore is cut to too small a diameter so that the bore has to be widened by friction by its wall pressing against the peripheral surface of the boring tool. This disadvantage becomes especially serious if for taking up the cutting pressure which is exerted upon it the borer is provided with guide members or guide strips which must be slightly set back relative to the cutting edge in the axial direction of the borer. As soon as these guide members enter into the mouth of the bore, the operation of widening the mouth to the full cutting diameter of the borer must be carried out by these guide members together with the outer edge of the cutter. Since these parts are really not made for this purpose, they become worn too quickly.

A further disadvantage of a boring bushing of the known types is due to the fact that, when the guide members enter the started bore, the pressure of the guide members upon the cutting edge which is caused by their forced entry into the too narrow mouth of the bore causes them to revolve along a circular path of a diameter which is larger than the diameter described by the borer when freely rotating so that the mouth of the bore is widened to a diameter exceeding the intended cutting diameter of the borer. As soon as the guide members have entered the bore and there is then no longer any need for the bore to be further widened, the bore gradually tapers down to the intended diameter. Such a tapered mouth of the bore is, however, often inadmissible, for example, if the bore is intended to serve as a hydraulic cylinder or the like.

It is an object of the present invention to provide a guiding device for a borer which fully overcomes the mentioned disadvantages of the known boring bushings. It is another object of the present invention to provide a guiding device which is designed such as to be non-rotatable relative to the borer and comprises three guide rods which extend parallel to the direction of feed of the borer and are stationary relative to and in engagement with the borer. These guide rods may be secured, for example, to a device which is moved with the borer toward the workpiece and either rotates with the borer or is non-rotatable with the borer if the workpiece to be bored is rotated. These guide rods may be made with such tolerance that the guide space for the borer defined by them has a diameter not greater than that described by the borer when freely rotating. When these guide rails are to be applied to a borer of a certain size, it is easily possible to adjust them accurately thereto by measuring the diameter which the freely rotating borer describes and by simply grinding them accordingly in a straight direction so that the guiding device thus produced guides the borer practically without play and thus overcomes the above-mentioned disadvantages in a surprisingly simple manner. Instead of grinding the guide rods, it is also possible to provide a variety of them of only slightly different widths and then to select those of the proper size for a particular borer.

It is still another object of the present invention to provide a guiding device for a borer, wherein in accordance with a preferred embodiment of the invention, the guide rods may also be designed such as to be radially adjustable within a cylindrical member which surrounds the borer, so as to permit the guiding device to be adjusted to a borer of a particular size. This has the additional advantage that the guiding device may be adapted to borers of various diameters.

Figure 2:
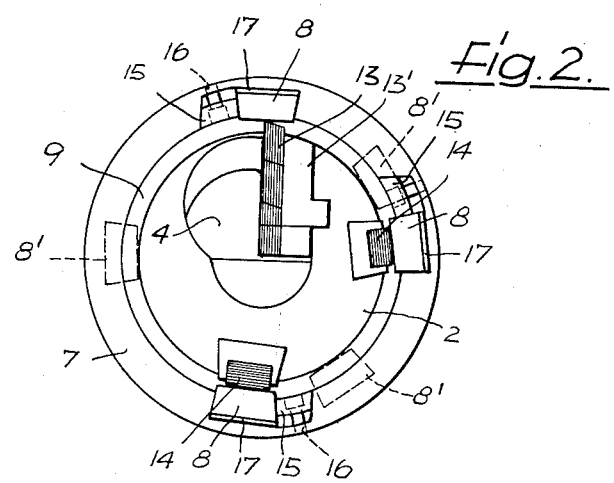

With these and other objects in view, which will become apparent in the following detailed description, the present invention will be clearly understood in connection with the accompanying drawings, in which:

FIG. 1 is an axial section of a grinding device according to the invention for a boring head; while FIG. 2 is an end view from below upon the boring head and the guiding device according to FIG. 1.

In FIG. 1 of the drawings, a workpiece 1 is illustrated into which a bore 3 is to be cut by means of a boring head 2. This boring head 2 is provided with a channel 4 for discharging a coolant which is supplied to the cutting point and also for discharging the borings with this coolant. The boring head 2 is surrounded by a tubular member 5 of a coolant supply device which is otherwise not shown and by a slidable member 6 in which a cylindrical supporting member 7 is mounted which carries the guide rods 8. Between the tubular member 5 of the coolant supply device and the cylindrical supporting member 7, on the one hand, and the boring head 2, on the other hand, an annular gap 9 is formed through which the coolant may be supplied to the annular space 11 between the cylindrical wall of bore 3 and the boring head 2. The pressure of the coolant forces the slide member 6 with the gasket 12 thereon against the upper surface of the workpiece 1. In the particular embodiment of the invention as illustrated it is assumed that the workpiece 1 is rotated, while all of the other parts are nonrotatable and merely the boring head 2 is slidable in the axial direction to cut the bore.

Boring head 2 is equipped with a cutter 13 which is secured to a supporting member 13′, and with two elongated guide members 14. Opposite to each of these parts 13 and 14, a guide rod 8 is mounted in the cylindrical supporting member 7. These guide rods 8 have a trapezoidal cross section and engage into corresponding axial grooves in the supporting member 7. For securing the guide rods 8 within the supporting member 7, each of them is associated with a clamping device which consists of a cleat 15 and setscrews 16. In this manner it is possible to adjust each of the guide rods 8 in a radial direction and to clamp it firmly in the adjusted position with the aid of a shim 17.

The guiding device according to the invention for guiding the boring head 2 therefore consists essentially of the three guide rods 8 which engage with the cutter 13 or the guide members 14, respectively. Since the guide rods 8 are adjustable in radial direction, they may also always be adjusted in accordance with the actual diameter described by the respective boring head 2 when freely rotating, regardless of the unavoidable manufacturing tolerances thereof, so that each boring head may be guided practically without play. It will thus be insured that the cutter 13 will always cut a bore 3 of a diameter which accurately corresponds to the diameter described by the boring head 2 when freely rotating so that the guide members 14 which are set back from the cutter 13 can enter into a bore which corresponds to the diameter described by the borer when freely rotating and no longer need to widen the mouth of the bore of a smaller diameter.

FIG. 2 also indicates in dotted lines a modification of the invention, in which the guide rods 8′ engage directly with the peripheral surface of the boring head 2. The surfaces of the guide rods 8 or 8′ facing the boring head 2 may be either plane or cylindrical. A plane surface has the advantage that it can be ground more easily in accordance with the cutting diameter of a particular borer. If the guide rails 8′ engage directly on the peripheral surface of the boring head 2, the engaging surfaces may be plane so that a lower contact pressure will then be attained.

Although the drawings illustrate a guiding device for a boring head 2, it is obvious that the invention may also be just as successflu applied to an ordinary borer.

In the particularly embodiment of the invention as previously described, it is assumed that the workpiece 1 rotates relative to the borer and its guiding device 7 and 8. The relation may, however, also be reversed so that the borer is rotated together with its guiding device, while the workpiece 1 is held in a nonrotary position. It is therefore merely of importance that the borer and its guiding device are nonrotatable relative to each other.

In order to protect the outer edge of the cutter 13, it is advisable to make the guide rods 8 which are provided for guiding this edge of a softer material than the other guide rods 8 which engage upon the guide members 14.

Although my invention has been illustrated and described with reference to the preferred embodiments thereof, I wish to have it understood that it is in no way limited to the details of such embodiments, but is capable of numerous modifications within the scope of the appended claims.

I claim:

1. A guiding device for a borer comprising a cylindrical member adapted to surround said borer, at least three guide rods spaced from each other and mounted within and supported by said member and engaging and guiding said borer at different points of the periphery thereof and extending parallel to the direction of the feed of said borer along areas of at least lines of contact between said guide rods and said borer and said guide rods being non-rotatable relative to said borer, and means for adjusting each of said guide rods independently from the adjustment of the other of said guide rods within said member in a radial direction relative to said borer.

2. A guiding device for a borer having a lateral cutter comprising at least three guide rods spaced from each other and extending parallel to the direction of feed of said borer along areas of at least lines of contact between said rods and said borer and said rods being non-rotatable relative to said borer, one of said guide rods engaging and guiding said cutter and at least two of said guide rods being adjustable independently from the adjustment of the other of said guide rods to engage with and to guide said borer at different points of the periphery thereof of spaced from said one of said guide rods, and means for supporting said guide rods.

3. A guiding device for a borer having at least one guide member secured thereto and comprising at least three guide rods spaced from each other and engaging and guiding said borer at different points of the periphery thereof, and extending parallel to the direction of feed of said borer along areas of at least lines of contact between said rods and said borer and said guide rods being non-rotatable relative to said borer, one of said guide rods being independently adjustable to engage with and to guide said guide member, and means for supporting said guide rods.

4. A guiding device for a borer having a lateral cutter and at least two guide members secured thereto and comprising at least three guide rods spaced from each other and extending parallel to the direction of feed of said borer along areas of at least lines of contact between said rods and said borer and said guide rods being non-rotatable relative to said borer, one of said guide rods being independently adjustable to engage with and to guide said cutter and at least two other of said guide rods being adapted to engage with and to guide said guide members at different points of the periphery of said borer spaced from said one of said guide rods, and means for supporting said guide rods.

5. A guiding device for a borer comprising a cylindrical member adapted to surround said borer and having grooves in the inner wall thereof spaced from each other, at least three guide rods mounted within said grooves and engaging and guiding said borer at different points of the periphery thereof and extending parallel to the direction of feed of said borer along areas of at least lines of contact between said rods and said borer and said guide rods being non-rotatable relative to said borer, and means for independently adjusting each of said guide rods within one of said grooves in the radial direction of said cylindrical member relative to said borer and for clamping said guide rods securely in the adjusted position within said groove.

6. A guiding device for a borer comprising a cylindrical member adapted to surround said borer, at least three guide rods spaced from each other and mounted within and supported by said member so as to be non-rotatable relative to said borer and each having a plane surface engaging and guiding said borer at different points of the periphery thereof and extending parallel to the direction of feed of said borer along areas of at least lines of contact between said rods and said borer, and means for independently adjusting each of said guide rods within said member in a radial direction relative to said borer.

7. A guiding device for a borer comprising a cylindrical member adapted to surround said borer, at least three guide rods spaced from each other and mounted within and supported by said member so as to be nonrotatable relative to said borer and each having a surface with a cylindrical curvature engaging and guiding said borer at different points of the periphery thereof and extending parallel to the direction of feed of said borer along areas of at least lines of contact between said rod and said borer, and means for independently adjusting each of said guide rods within said member in a radial direction relative to said borer.

8. A guiding device for a borer having a lateral cutter and at least two guide members secured thereto and comprising at least three guide rods spaced from each other and extending parallel to the direction of feed of said borer along areas of at least lines of contact between said rod and said borer, and said guide rods being non-rotatable relative to said borer, one of said guide rods engaging and guiding said cutter and at least two other of said guide rods being independently adjustable to engage with and to guide said guide members at different points of the periphery of said borer spaced from said one of said guide rods, said one of said guide rods for said cutter consisting of a softer material than said other of said guide rods for said guide members, and means for supporting said guide rods.

References Cited in the file of this patent

FOREIGN PATENTS 1,098,870     France  ---------------- Mar. 9, 1955